July 18, 1972    R. P. EDMONSTON ET AL    3,677,993
COMPOSITIONS FOR GASKETS HAVING IMPROVED RESISTANCE TO
WATER-BASED AEROSOL PRODUCTS
Filed March 10, 1970

INVENTORS
ROBERT P. EDMONSTON
JOEL A. GRIBENS
CHARLES W. SIMONS

United States Patent Office 3,677,993
Patented July 18, 1972

3,677,993
COMPOSITIONS FOR GASKETS HAVING IMPROVED RESISTANCE TO WATER-BASED AEROSOL PRODUCTS
Robert P. Edmonston, Billerica, Joel A. Gribens, Framingham, and Charles W. Simons, Bedford, Mass., assignors to W. R. Grace & Co., Cambridge, Mass.
Filed Mar. 10, 1970, Ser. No. 18,262
Int. Cl. C08c *11/56, 11/50;* C08d *9/00*
U.S. Cl. 260—33.6 A 1 Claim

ABSTRACT OF THE DISCLOSURE

Compositions for use as sealing gaskets in aerosol mounting cups, which contain a peptized polychloroprene rubber dissolved in a volatile organic solvent and a ternary curing system consisting of di-o-tolylguanidine, 2-mercaptoimidazoline and dipentamethylenethiuram hexasulfide. Additional ingredients such as fillers, plasticizers, antioxidants and pigments may be incorporated to modify certain properties of the compositions and of the gaskets made from them.

THE PRIOR ART

Pressurized aerosol containers are increasingly used in packaging and dispensing a wide variety of materials. In this type of application, the product to be dispensed is confined under pressure by means of a volatile propellant and is discharged in a controlled manner through a valve-actuated orifice. A typical aerosol unit is composed of a hollow cylindrical container closed at one end and provided with an opening at its opposite end for receiving a dispensing valve assembly. A metal mounting cup serves as a closure for the container and also as a support for the valve assembly which is tightly fitted within an aperture centrally located in the cup. The mounting cup carries an annular gasket which is adapted at its outer edge to be rolled and crimped to the walls forming the opening in the container and thereby form a seal upon crimping.

The gasketing material used in aerosol mounting cups should be elastic and resilient so that it yields under deforming forces to establish a satisfactory seal when the cup is crimped to the container and to maintain the seal over normal storage periods. Among the gaskets employed are those of the "flowed-in" type prepared from solvent-based rubber compositions comprising an elastomer dissolved in a volatile organic solvent. These compositions may also contain pigments, fillers, curing agents and other compounding ingredients. Because neoprene (a chlorobutadiene polymer) possesses superior resistance to oxidation, oils, propellants and many chemicals found in aerosol containers, it is most widely used in such compositions. Neoprene is dissolved in a suitable solvent, such as toluene, to assist in uniformly depositing the composition in the mounting cup. In preparing gaskets from these compositions, a band of the fluid material is deposited in the channel of the mounting cup while the cup is being rotated beneath a metering nozzle through which the composition flows to form a continuous deposit. Thereafter the deposit in the cup is converted into a dry solid elastomeric sealing mass by expelling the solvent and curing it at elevated temperatures.

While gaskets derived from compositions containing neoprene perform admirably in many aerosol containers, the gaskets are vulnerable to attack when used to seal water-in-oil emulsion packed products, such as insecticidal compositions, window cleaning compositions, simulated snow compositions for decorative purposes and other spray type packages. In such packages the emulsion attacks the neoprene gasket and causes it to degrade. Degradation results in flaking of the gasket which in turn adversely affects the performance of the aerosol unit. For example, the valve may become clogged due to the deposition and accumulation of the flaked solid rubber particles around the valve orifice and in the passageways leading to the orifice. Valve leakage is also a frequent source of trouble due to the flaked particles present in the valve seat which prevent the valve from closing properly and allow the propellant to escape. Another common problem is that the flaked particles settle and either aggravate the valve clogging or they may entirely prevent discharge of the product.

In general, a high degree of resistance to such water-based products can be obtained by increasing the number of crosslinkages between polymer molecules. Crosslinking is effected by curing agents in the presence of cure accelerators. However, the presence of accelerators in the liquid composition can greatly decrease its storage stability due to an increase in viscosity. Storage stability is a necessary property which the composition must possess if it is to be properly lined in mounting cups.

SUMMARY OF THE INVENTION

According to the present invention, it is now possible to line mounting cups with curable neoprene-based gasket-forming compositions and obtain gaskets which overcome the drawbacks of conventional gaskets in the presence of water-in-oil emulsion packs. This is accomplished by the use of a ternary curing system consisting of di-o-tolylguanidine, 2-mercaptoimidazoline and di-pentamethylenethiuram hexasulfide. Chloroprene rubber compositions containing this ternary curing system not only yield gaskets with outstanding resistance to degradation by water-based aerosol products, but they also possess the necessary storage stability which renders them industrially useful.

DESCRIPTION OF THE DRAWING

The present invention will be more clearly understood on reference to the accompanying drawing and to the discussion relating thereto:

FIG. 1 is a side elevational view of a typical aerosol container provided with a mounting cup and valve unit.

FIG. 2 is an axial sectional view of the aerosol mounting cup of FIG. 1 carrying a gasket prepared from compositions of the present invention.

FIG. 3 is a fragmentary axial sectional view of the upper portion of the aerosol container of FIG. 1 showing the gasketed mounting cup of FIG. 2 crimped in position over the mouth of the container.

Referring to FIG. 1, a typical aerosol container is illustrated which comprises a cylindrical body portion 10 fitted with a domed top portion 12 and a bottom closure 11. The container is provided with a metering valve generally designated at 13 which is actuated by button 15. The actuator button is carried on a hollow valve stem 14 and is provided with an orifice 16 through which the container contents are discharged when valve 13 is opened. Communicating with valve 13 is a dip tube 17 which is of sufficient length to allow the contents to be discharged from the container. The valve unit, which may be any of the various types known to the art, is supported by a mounting cup, generally designated at 18, which is adapted to receive the valve stem 14. The mounting cup also serves as a closure for the container and carries the sealing gasket in the annular channel 22 which is applied over the opening in the domed top portion 12 of the container.

An axial sectional view of mounting cup 18 is shown in FIG. 2 in inverted position relative to its placement in the assembled container. The cup comprises a circular panel 19 having an integral skirt 20 depending from its periphery. The free edge of skirt 20 is outwardly flanged at 21 to form an annular gasket-receiving channel 22. The inner portion of panel 19 is countersunk to form a tubular recess, generally designated at 23, which has a dependent circular wall 24 integrally joined with an apertured horizontal wall 25. When the cup is placed in sealing position, the tubular recess 23 acts as a pedestal for the valve unit and the valve stem is admitted into the container through apertured wall 25. The gasket 26 is disposed predominantly in the annular channel 22 of the cup.

FIG. 3 shows the gasketed mounting cup of FIG. 2 crimped on position over the mouth of an aerosol container. As illustrated in FIG. 3, the open end of domed portion 12 of the container is provided with an outwardly curled peripheral bead 27 which defines the container mouth. The annular channel 22 of the mounting cup embraces the bead 27 of the container so that the gasket 26 carried by channel 22 is positioned on bead 27. The lower portion of the skirt 20 is flared outwardly against the wall of domed portion 12 adjacent to the bead 27. The gasket forms a seal between the skirt and the wall adjacent to the container mouth.

The water-in-oil aerosol spray offers a method of dispensing active products that are insoluble in the propellant. Typical propellants include halogenated hydrocarbons, such as chlorofluoro lower alkanes of which trichloromonofluoromethane, dichlorodifluoromethane and dichlorotetrafluoroethane are illustrative. By dissolving an active ingredient in water and then emulsifying it into the propellant system, a spray product can be formulated. The propellant forms the continuous or "oil" phase, and the water and active materials constitute the dispersed or "water" phase. Typical emulsifiers which are useful with chlorofluoro alkanes include polyglycerides of fatty acids, sorbitan monolaurate and polyethylene glycol 400 ditriricinoleate.

DETAILED DESCRIPTION OF THE INVENTION

Figure 1:
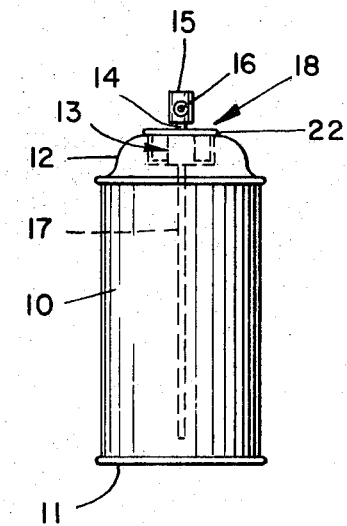
Figure 2:
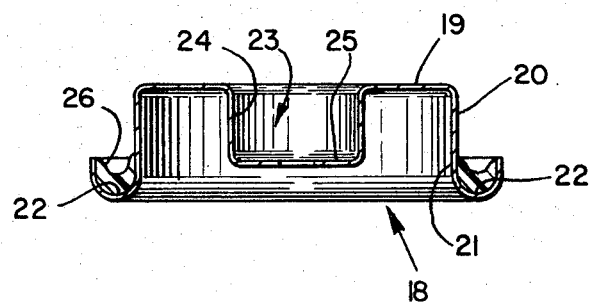
Figure 3:
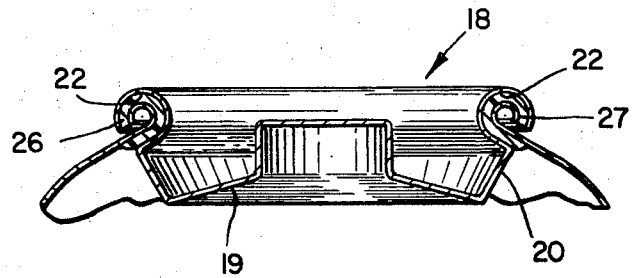

The compositions of this invention which form acceptable gaskets for the water-based aerosol products just described, are comprised essentially of a peptized curable elastomeric polymer of 2-chloro-1,3-butadiene dissolved in a volatile organic liquid, and a ternary curing system consisting of about 1 to 10 parts by weight di-o-tolylguanidine, about 2 to 8 parts 2 mercaptoimidazoline and about 2 to 8 parts dipentamethylenethiuram hexasulfide per 100 parts of rubber polymer. The improvement achieved by the use of this accelerator system is optimized when there is employed 6 parts, 4 parts and 4 parts of each respective compound per 100 parts of rubber.

As mentioned earlier, the compositions of the invention are composed of a polymer of 2-chloro-1,3-butadiene dissolved in a volatile organic liquid. This polymer may be either a homopolymer or a copolymer of the butadiene with minor quantities of other monomers including styrene, acrylonitrile and isoprene. The polymer may be dissolved in a single volatile organic liquid or in a mixture of such liquids able to function together as a solvent medium. Preferred usable organic liquids for this purpose are those that have a minimum boiling point of 230° F. as well as mixtures of liquids that do not boil below 230° F. and yet are capable of volatilization from the compositions in the course of the overall drying and curing cycle to which the gasketing compounds are subjected. Illustrative of this type of liquid are toluene, xylene, a high boiling petroleum solvent such as "Solvesso 100" which has a boiling point range of about 230° to 345° F., an aliphatic petroleum solvent such as "Varsol #1" which boils between 320° and 390° F., and mixtures of such solvents.

The compositions may include a non-volatile liquid plasticizer in quantities ranging between about 0 and 200 parts by weight per 100 parts by weight of polymer. Though their use is not essential, plasticizers facilitate mixing of the polymer with other ingredients, such as fillers, and also enhance the sealing characteristics of the resulting gasket. When added in quantities of about 200 parts, the plasticizer has a tendency to exude from the cured composition. Preferably, the plasticizer is used at a level between about 40 and 100 parts by weight to give gaskets having the requisite degree of hardness to insure satisfactory sealing. Illustrative plasticizers include dioctyl sebacate, dioctyl adipate, didecyl phthalate, dioctyl phthalate, naphthenic oils or any relatively non-volatile liquid plasticizing material used as processing aids for neoprene rubber.

While the presence of inorganic fillers is not essential in these compositions, their use in sealing aerosol containers tends to reduce the permeability of the gasket to propellants. The fillers are also helpful in modifying the specific gravity and flow characteristics of the fluid composition. Suitable fillers include hydrated calcium silicate, fine sized whiting, talc, silicon dioxide and clays. The quantity of filler may range between about 0 and 300 parts by weight based on 100 parts by weight of polymer. Above about 300 parts, the gasket becomes too hard and lacks the resilience and elasticity which is desired for sealing purposes. Generally, amounts ranging between about 80 and 200 parts by weight are preferred, though the exact quantity used will depend upon the selected filler or combination of fillers, the characteristics they impart to the fluid composition, and the properties they impart to the cured gasket.

It is also desirable to use a peptizer for the polymer. Peptizers allow greater ease in adjusting the viscosity of the composition to a value within the range required for standard lining equipment. Typical peptizers include alkyl thiuram disulfides, e.g. tetramethyl and tetraethyl thiuram disulfides; piperidinium alkyl dithiocarbamates, e.g. piperidinium pentamethylene dithiocarbamate; and guanidines. Peptizers are used in quantities preferably between about 0.5 and 6 parts by weight based on 100 parts by weight of polymer.

Other ingredients may be incorporated into the composition to impart desirable properties. These include lubricants, e.g. stearic acid and petroleum waxes; antioxidants, e.g. diphenyl-p-phenylenediamine and p - (p - tolylsulfonylamide) diphenylamine; and pigments, e.g. carbon black, iron oxide and titanium dioxide. When lubricants, antioxidants, pigments and other ingredients are employed, they are used in conventional quantities to achieve the desired effect.

The volatile organic liquid is used in quantities such as to give compositions having a total solids concentration between about 40 and 75% by weight, and preferably between about 50 and 65% by weight. The total solids portion of the compositions includes the combined weight of polymer, fillers, curing mixture and the other substantially non-volatile ingredients employed. With less than about 50% total solids, it is difficult to obtain the thick gaskets required for areosol mounting cups in a single pass through closure lining machinery. With more than about 65%, on the other hand, the compositions become quite thick and it is difficult to maintain the viscosity within a range that can be lined on conventional automatic lining machinery.

The invention is further illustrated by the following example which describes a typical composition possessing both a desirable storage stability and the capacity of forming gaskets with satisfactory resistance to water-based aerosol products.

EXAMPLE

| Ingredient: | Parts |
| --- | --- |
| Chloroprene rubber | 100 |
| Aluminum silicate clay | 140 |
| Paraffin wax | 2.0 |
| Sodium acetate | 1.8 |
| Magnesium oxide | 3.0 |
| Tetraethylthiuram disulfide | 2.5 |

| Ingredient: | Parts |
|---|---|
| Piperidinium pentamethylene dithiocarbamate | 2.0 |
| Zinc oxide | 6.25 |
| Diisodecyl phthalate | 75 |
| Curing system: | |
| Di-o-tolylguanidine | 6.0 |
| 2-mercaptoimidazoline | 4.0 |
| Dipentamethylene thiuram hexasulfide | 4.0 |

Toluene added in quantities sufficient to give a total solids content of 62% by weight in the final composition.

The composition was prepared by first milling the polymer for about one minute in a Banbury mixer. The sodium acetate, paraffin wax, about 57% by weight of clay, about 9 parts by weight of diisodecyl phthalate, and a blend composed of the magnesium oxide and about 6 parts by weight of toluene were then slowly added and to and mixed with the polymer for about six minutes. The batch was transferred to a Sigma mixer and the remaining amount of clay, the tetraethylthiuram disulfide and piperidinium pentamethylene dithiocarbamate were added. The batch was masticated for about one hour. About 50 parts by weight of diisodecyl phthalate and 200 parts by weight of toluene were then slowly added and mixed for about two hours. A second blend composed of 2-mercaptoimidazoline, di-o-tolylguanidine, dipentamethylene thiuram hexasulfide, zinc oxide and the remaining portion of diisodecyl phthalate was added and the entire batch was mixed for about 20 minutes while maintaining the temperature of the batch below 110° F. Some volatilization of toluene occurred during processing so that the total solids content of the final composition was about 62% by weight. The viscosity of the freshly-prepared composition was about 2000 centipoises as measured on a Brookfield viscometer, model LVF5X, No. 3 spindle at 30 r.p.m. and 85°±2° F.

The storage stability of the composition and the resistance of gaskets obtained from it was measured in the following manner:

The storage stability, or pot life, is determined by the change in the viscosity of the composition which may occur from the time of manufacture to the time when the composition is lined in the channel of an aerosol mounting cup. Since the desired pot life of a satisfactory compound is a minimum of three months, any compound retaining a lineable viscosity after a three month period is a commercially satisfactory compound. Limits for lineable viscosities have been set by field experimentation at 1800 to 4200 centipoises. Since no compound of this type is manufactured with a viscosity greater than 2300 cps., any compound showing a rise in viscosity of 1900 cps. or less after 3 months at room temperature is considered to possess a commercially satisfactory pot life. Moreover, after comparing the viscosity rise of numerous compounds at room temperature with that at 100° F., it has been concluded that storage for one week at 100° F. is nearly equivalent to storage for one month at room temperature. The present shelf life testing has therefore been carried out at 100° F. and a compound showing a viscosity rise of 1900 cps. or less after three weeks in storage at 100° F. is considered commercially stable.

The resistance of gaskets derived from the compositions of the invention was tested as follows: A representative portion of the stored composition was used to line a number of standard areosol mounting cups to form sealing gaskets. The cups had an outside skirt diameter closely approaching one inch and were thus of the type used to seal metal aerosol containers having a filling opening with an inside diameter of 1.000±0.004 inch. The lining was done by depositing the composition through a nozzle into the channel of the cup, the latter being seated on a rotary chuck on standard automatic lining machinery. Lining was carried out at a rate of 150 to 200 cups per minute. The quantity of composition deposited in each cup averaged about 500 mg. wet weight which is equivalent to a dry weight of 310 mg.

The lined cups were dried and cured according to the following schedule:

| Time (hr.): | Temperature |
|---|---|
| 1 | Air dried at ambient temperature. |
| 1 | 155° F. |
| 1 | 200° F. |
| 1 | 325° F. |

The mounting cups containing the cured gasket were tested for degradation of the gasket in the presence of a water-in-oil emulsion of the following composition:

| Ingredients: | Parts by wt. |
|---|---|
| Naphtha (odorless mineral spirits), B.P. 244–291° F. | 7 |
| Water | 53 |
| Toluene | 3 |
| Polyglycerol ester of oleic acid (Emcol 14) | 2 |

The emulsion was mixed on an air mixer until milky white in appearance. Between ten and twenty mounting cups lined in the manner already described with the compound to be tested were immersed completely in the emulsion. The cups were periodically removed from the emulsion, washed and rated for gasket appearance. The rating was as follows:

| Rating: | Description of gasket |
|---|---|
| 1 | Not attacked. |
| 2 | Mildly attacked. |
| 3 | Severely attacked. |
| 4 | Completely degraded. |

The observed ratings were plotted on a graph against the hours of residence in the emulsion. The best straight line was then drawn through the points plotted. The number of hours needed to achieve a rating of 2.5 was then interpolated from the line and was used for comparision with similarly tested conventional and experimental compounds.

Upon testing the compound described in the example for shelf life and gasket resistance by the methods just described and on comparison of the results so obtained with the performance of a conventional gasketing compound not containing any cure accelerator, it was found that no change in viscosity occurred in either case after three weeks storage at 100° F. and that the compound of the invention containing the ternary accelerator cure system withstood the test emulsion for 1200 hours before undergoing a 2.5 level deterioration. This constitutes a 2.4-fold improvement over the resistance of gaskets made from conventional compounds, a rather remarkable change considering that the additional crosslinking process did not, as might well be expected, contribute an unacceptable increase in viscosity of the compound on storage.

It was also determined that this delicate balance of shelf life and gasket characteristics could not be obtained in the absence of any the three components of the ternary curing system disclosed. In the latter instances, it was observed that either the cure was insufficient or the pot life drastically reduced. Also, as mentioned earlier, substantial improvement in gasket resistance could be achieved, without causing the viscosity of the rubber compositions to increase to more than 1900 cps. after storage at 100° F. for three weeks, by varying the proportions of curing accelerators within about 2 to 8 parts by weight per 100 parts rubber for the imidazoline and the hexasulfide and about 1 to 10 parts for the substituted guanidine.

It is apparent from the foregoing description that it is possible, without departing from the spirit of the invention, to employ the new critical ternary accelerator curing system to a varied selection of solvent-based chloroprene polymer compositions and thereby impart to them the improved balance of composition and gasket characteristics that this ternary system has now been discovered to achieve.

What is claimed is:

1. A gasket-forming composition comprising 100 parts by weight of a polymer of 2-chloro-1,3-butadiene dissolved in a volatile hydrocarbon liquid, and a ternary curing system consisting of about 6 parts di-o-tolylguanidine, about 4 parts 2-mercaptoimidazoline and about 4 parts dipentamethylene thiuram hexasulfide.

References Cited

UNITED STATES PATENTS

| | | | |
|---|---|---|---|
| 2,006,057 | 6/1935 | Northam | 260—784 |
| 3,351,572 | 11/1967 | Jameson | 260—5 |
| 3,397,173 | 8/1968 | Collette | 260—45.9 |
| 3,478,127 | 11/1969 | Petersen | 260—845 |
| 3,531,444 | 9/1970 | Behrens | 260—79.5 |

OTHER REFERENCES

Murray, R. M., and Thompson, D. C., Rubber World (reprint), November 1954.

JOSEPH L. SCHOFER, Primary Examiner

C. A. HENDERSON, JR., Assistant Examiner

U.S. Cl. X.R.

260—237 H, 23.7 M, 41.5 R, 45.9 R, 79.5 B, 779, 793, 797